Oct. 7, 1930.   W. R. SEYFRIED   1,777,582
SMELTING OF PHOSPHATIC MATERIAL IN AN ELECTRIC FURNACE
Filed May 14, 1925
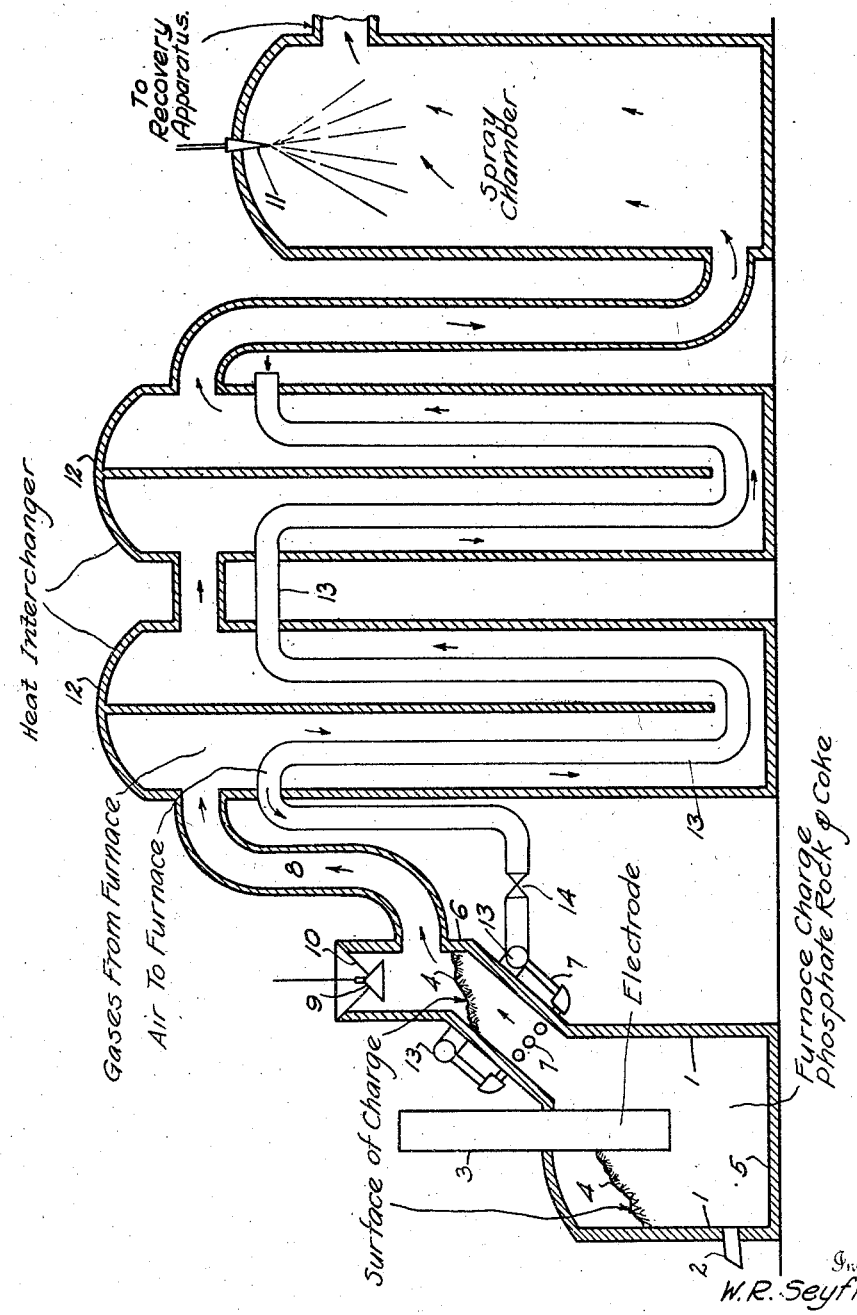
Inventor
W. R. Seyfried.

Patented Oct. 7, 1930

1,777,582

UNITED STATES PATENT OFFICE

WARREN R. SEYFRIED, OF ANNISTON, ALABAMA, ASSIGNOR, BY MESNE ASSIGNMENTS, TO SWANN RESEARCH, INC., OF BIRMINGHAM, ALABAMA, A CORPORATION OF ALABAMA

SMELTING OF PHOSPHATIC MATERIAL IN AN ELECTRIC FURNACE

Application filed May 14, 1925. Serial No. 30,380.

This invention relates to the smelting of phosphatic material in an electric furnace and the production therefrom of phosphoric acid and calcium carbide.

It has for one of its objects the improvement of operations; and the utilization of heat resulting from the oxidation of the evolved furnace gases in a manner differing from any method heretofore proposed. It has as a further object the production of calcium carbide as an important by-product.

It has been proposed heretofore to smelt phosphate rock with carbon and silica in sufficient quantities that the phosphorus be liberated as elemental phosphorus and the silica combine with the lime of the phosphate rock to form a slag sufficiently fluid to permit continuous furnace operation. It has also been proposed to smelt phosphate rock directly with silica where the silica re-acted with the lime of the phosphate rock and formed calcium silicate, while the phosphorus pentoxide was liberated as such. In the operation of such processes as above described there is a great deal of heat liberated when the phosphorus and carbon monoxide are oxidized to phosphorus pentoxide and carbon-dioxide. It is, therefre, obvious that the utilization of the resultant heat from the oxidation of these gases should be an important feature in the operation of this process. I have discovered in the operation of such a process that the temperature of the evolved gases rising through the stock from the fusion zone and contacting with the silica in the charge, causes an agglomeration which forms a seal over the fusion zone and materially retards the escape of the phosphorus bearing gases, thereby adversely affecting the operation of the furnace. It is, therefore, apparent that the utilization of heat from phosphate rock smelting operation where silica is used in the charge involves serious difficulties in economically handling the furnace. I have conceived a process whereby this objectionable operating condition arising in connection with the production of phosphoric acid may be overcome, and at the same time produce calcium carbide, availing myself of all of the advantages arising from efficient heat transfer of the oxidation of a part of the evolved gases. My process contemplates the use in an electric furnace of a charge comprising phosphate rock and a carbonaceous reducing agent in sufficient quantity to reduce the phosphorus pentoxide to elemental phosphorus, and also to combine with the lime and produce calcium carbide. A suitable furnace for this purpose has means for the introduction of air between the fusion zone and the surface of the charge.

It is recognized that the production of elemental phosphorus and calcium carbide in an electric furnace has been proposed heretofore. I do not claim the production of calcium carbide and elemental phosphorus, but base my claims entirely on the utilization of heat as specifically outlined in the claims. It was conceived essential that a reducing atmosphere be maintained in the furnace as proposed by Moorehead in U. S. Patents Nos. 862,092 and 862,093; however, under those conditions it was the prime object of the process to produce elemental phosphorus, and it is well known that this may be accomplished only in the presence of a reducing atmosphere. My object in utilizing air within the furnace, where a mixture of phosphate rock and carbon is used, is to effect an efficient transfer of the heat of oxidation of the gases and by using such mixture I am enabled to utilize heat which otherwise would not be possible were the burden for the furnace composed, as has been proposed for producing phosphoric acid, of a mixture of phosphate rock, silica, and carbon. It is, therefore, apparent since the agglomerating of the charge results from the action of the gases where silica is present that a modification of the fundamental composition of the burden is necessary and I accomplish this by using a mixture of phosphate rock and carbon, instead of phosphate rock, silica, and carbon.

The charge is composed of phosphatic material, preferably phosphate rock (tri-calcium phosphate) to which is added a carbonaceous reducing agent, preferably coke. Such a burden is subjected to the high temperatures of the electrical arc producing a fusion zone in the crucible wherein the charge is smelted and the phosphorus liberated, the combination of the reducing material and lime forming calcium carbide. The evolved gases rise through the stock in the stack at a high temperature, and when they come in contact with the oxygen, they burn and generate a large quantity of heat which is, to a great extent, absorbed by the stock. Since there is no silica present in the charge, no agglomeration or sealing takes place.

The gases, thus liberated and partly oxidized, emerge from the stock after transferring a major portion of their heat of combustion thereto, and pass off from the furnace, mainly as carbon monoxide gas, and phosphorus pentoxide. These gases then pass through a combustion chamber and heat interchanger, where the carbon monoxide is oxidized to carbon dioxide. Preferably, the carbon monoxide is burned in any suitable heat transfer apparatus, such as is conventionally illustrated at 12 and caused to heat the blast of air flowing through ducts 13 to the air inlet ports 7 of the furnace. The phosphorus pentoxide is hydrated to phosphoric acid by any suitable means, as for instance a water or steam spray 11, and after hydration it is collected in any suitable apparatus adapted for the purpose. This gives a closed cycle for the heat and reduces the amount of electrical energy necessary for the smelting of the charge because it delivers the charge to the fusion zone in a highly preheated condition.

As illustrative of a suitable type of furnace for carrying my present process into effect, reference is made to the accompanying drawings wherein in vertical cross-section, I show a furnace having a crucible 1, a tap hole 2, suitable holes for the admission of electrodes 3 entering the charge 4, that rests on the hearth 5 of the crucible. The evolved gases from the crucible rise through an upper or stack portion 6 of the furnace through which the charge descends to the crucible, and I provide any desired number of ports 7 in this stack portion for the introduction of air or other oxidizing agents into the charge below the upper surface thereof. The evolved partially oxidized gases which emerge from the charge pass off through a conduit 8 and heat interchanger 12 to any suitable acid-recovery apparatus, not shown, since my invention contemplates that the phosphoric acid produced may be recovered by any well known process.

The furnace is provided with a conventional charging apparatus, such as the bell 9 and hopper 10.

The following will illustrate in a typical manner the proportions of a furnace charge which could be used in the practice of my invention, to-wit 1500 lbs. of phosphate rock and 700 lbs. of coke. The coke and phosphate rock are thoroughly mixed and charged through the top of the furnace and the stock level is maintained substantially above the ports 7. The probable reactions occurring in the charge are as follows:—Assuming the furnace in operation, the air, preferably preheated and limited to the quantity sufficient for the oxidation of the evolved phosphorus gases, will oxidize the phosphorus and some of the carbon monoxide gas as well as some of the coke in the charge. The heat of combustion thus produced will raise the temperature of the stock and may liberate more or less of the phosphoric content in the charge. The resulting carbon dioxide gases, on coming in contact with the coke in the upper portion of the charge, will be reduced by it, emerging from the charge as carbon monoxide gas to pass off from the furnace carrying the phosphorus pentoxide therein. As the heated charge descends into the crucible, the high temperatures therein cause the phosphoric content remaining in the charge to be evolved as elemental phosphorus and will cause the carbon and lime to combine and form calcium carbide, which latter is tapped out from time to time. An analysis of the above operation shows that in the lower part of the furnace, where the highest temperatures exist, the carbide is produced and the major portion of the elemental phosphorus is evolved in a reducing atmosphere, and an oxidizing atmosphere exists at an intermediate point in the stock where a high heat recovery is effected. In the top of the furnace a reducing atmosphere again exists, due to the carbon monoxide gas. If a substantial amount of silica existed in the charge, the practical operation of the process would be materially interfered with by the agglomeration with the phosphorus to form scaffolds and channels, or a gas sealing zone which would retard or entirely prevent the escape of the evolved gases.

The limiting of the volume of air to that approximately equal to the theoretical requirement for the oxidation of the evolved phosphorus is a desirable feature because an excess of air would increase the coke requirement. The volume of air can be regulated in any suitable manner as will be seen by valves 14 provided in the air duct 13.

Though I have described with great particularity the details of the embodiment and practice of the invention herein shown, it is not to be construed that I am limited thereto, as changes in arrangement and substitution of equipment may be made by those skilled in the art without departing from the invention as defined in the appended claims.

Having thus described my invention, what I claim as new and desire to secure by Letters Patent, is:—

1. The hereindescribed process for the joint production of calcium carbide and phosphoric acid, which consists in charging a furnace with phosphatic and carbonaceous material, providing a fusion zone from which air is excluded to evolve elemental phosphorus and produce calcium carbide, admitting preheated air to oxidize the evolved phosphorus gases in the presence of the charge to utilize the sensible heat of the gas and the resultant heat of combustion to preheat the charge, carrying off the resulting phosphorus pentoxide in a reducing atmosphere, oxidizing the reducing atmosphere in position to transfer the heat of combustion to air admitted to oxidize the evolved phosphorus, and hydrating the phosphorus pentoxide to produce phosphoric acid.

2. In a process of producing phosphoric acid and calcium carbide at one operation, the steps which comprise smelting a charge of phosphate rock and coke in a zone from which air is excluded, introducing preheated air into the upper part of the charge above the smelting zone to oxidize the evolved phosphorus, and completing the oxidation of the evolved gases apart from the furnace in heat transfer relation with the air being introduced to preheat said air.

3. In a process of producing phosphoric acid and calcium carbide at one operation, the steps which comprise providing a descending furnace charge of phosphate rock and coke, smelting the charge in the bottom of the furnace while excluding air from the smelting zone and passing the evolved gases through the upper part of the charge, introducing preheated air into said upper part of the charge above the smelting zone to partly oxidize the evolved gases, and completing the oxidation of the evolved gases in heat transfer relation with the air being introduced to preheat said air.

In testimony whereof I affix my signature.

WARREN R. SEYFRIED.